United States Patent
Mere et al.

(10) Patent No.: US 11,538,346 B2
(45) Date of Patent: Dec. 27, 2022

(54) FLIGHT MANAGEMENT ASSEMBLY OF AN AIRCRAFT, OF A TRANSPORT AIRCRAFT IN PARTICULAR, AND TO A METHOD OF MONITORING SUCH A FLIGHT MANAGEMENT ASSEMBLY

(71) Applicant: Airbus Operations (S.A.S.), Toulouse (FR)

(72) Inventors: Jean-Claude Mere, Verfeil (FR); Sylvain Raynaud, Cornebarrieu (FR)

(73) Assignee: Airbus Operations (S.A.S.), Toulouse (FR)

( * ) Notice: Subject to any disclaimer, the term of this patent is extended or adjusted under 35 U.S.C. 154(b) by 728 days.

(21) Appl. No.: 16/458,483

(22) Filed: Jul. 1, 2019

(65) Prior Publication Data
US 2020/0005654 A1 Jan. 2, 2020

(30) Foreign Application Priority Data
Jul. 2, 2018 (FR) ...................................... 1856082

(51) Int. Cl.
*G08G 5/00* (2006.01)
*G06F 16/23* (2019.01)

(52) U.S. Cl.
CPC ....... *G08G 5/0034* (2013.01); *G06F 16/2365* (2019.01); *G08G 5/0039* (2013.01)

(58) Field of Classification Search
CPC ................ G08G 5/0034; G08G 5/0039; G06F 16/2365
See application file for complete search history.

(56) References Cited

U.S. PATENT DOCUMENTS 8,660,715 B2 2/2014 Nicolas et al.
8,843,249 B2 9/2014 Potagnik et al.
(Continued)

FOREIGN PATENT DOCUMENTS

| EP | 2 463 738 A1 | 6/2012 |
| FR | 2 970 093 A1 | 7/2012 |
| FR | 3 038 709 A1 | 1/2017 |

OTHER PUBLICATIONS

French Search Report for Application No. 1856082 dated May 13, 2019.

*Primary Examiner* — Hussein Elchanti
(74) *Attorney, Agent, or Firm* — Jenkins, Wilson, Taylor & Hunt, PA (57) ABSTRACT

A flight management assembly of an aircraft and method of monitoring the flight management assembly. The assembly includes two flight management systems, and a monitoring and backup unit, each of the flight management systems configured for generating data including a trajectory and a prediction of a parameter of the aircraft, one of the flight management systems being active and the other being passive, the monitoring and backup unit configured for carrying out monitoring of at least one of the items of data generated by the active flight management system in order to verify if the item of data is valid, the flight management assembly carrying out, in case of validation of the monitored item of data, a synchronization of the monitoring and backup unit and of the passive flight management system, with data called synchronization data of the active flight management system, namely a flight plan and/or a flight trajectory.

15 Claims, 2 Drawing Sheets

(56) References Cited

U.S. PATENT DOCUMENTS

| | | |
|---|---|---|
| 10,077,119 B2 | 9/2018 | Mere |
| 2016/0236790 A1* | 8/2016 | Knapp ................. G08G 5/0021 |
| 2019/0033862 A1* | 1/2019 | Groden ................ G08G 5/0086 |
| 2020/0026273 A1* | 1/2020 | He ........................ G05D 1/0022 |
| 2020/0354078 A1* | 11/2020 | Brooks ................. B64D 47/06 |

* cited by examiner

FLIGHT MANAGEMENT ASSEMBLY OF AN AIRCRAFT, OF A TRANSPORT AIRCRAFT IN PARTICULAR, AND TO A METHOD OF MONITORING SUCH A FLIGHT MANAGEMENT ASSEMBLY

CROSS-REFERENCE TO RELATED APPLICATION

This application claims priority to French patent application number 18 56082 filed on Jul. 2, 2018, the entire disclosure of which is incorporated by reference herein.

TECHNICAL FIELD

The disclosure herein relates to a flight management assembly of an aircraft, of a transport aircraft in particular, and to a method of monitoring such a flight management assembly.

BACKGROUND

The disclosure herein applies to a flight management assembly comprising two flight management systems, of the FMS type ("FMS" standing for "Flight Management System" in English).

The items of hardware installed on board an aircraft and notably the flight management assembly must make it possible to attain the required level of safety, in particular if the aircraft must implement RNP AR operations ("RNP AR" standing for "Required Navigation Performance with Authorization Required" in English). These RNP AR operations are based on area navigation of the RNAV type ("RNAV" standing for "aRea NAVigation" in English) and on operations of the RNP type ("RNP" standing for "Required Navigation Performance" in English).

Now, in order that an aircraft may have the capability of flying according to such RNP AR procedures, it is notably necessary to be able to eliminate an erroneous source of computation of guidance commands (or instructions) from the guidance loop in order to counter its possible effects on the trajectory of the aircraft. With a flight management assembly having two flight management systems, in the case of a disagreement between the two flight management systems, the assembly is not capable of identifying which one of them is defective, and the aircraft can therefore no longer be guided in automatic mode and is not capable of implementing such RNP operations.

In such a flight management assembly having two flight management systems, it is therefore necessary to be able to carry out processings and/or verifications allowing the aircraft to use accurate data in order to overcome the aforementioned disadvantage.

SUMMARY

The purpose of the disclosure herein is to overcome this disadvantage. It relates to a flight management assembly of an aircraft, the flight management assembly comprising two flight management systems, each of the flight management systems being configured for generating data comprising at least one trajectory and at least one prediction of a parameter of the aircraft.

According to the disclosure herein, one of the flight management systems is called active (or master) and the other one is called passive (or slave), the flight management assembly comprising, moreover, a monitoring and backup unit, this monitoring and backup unit being configured for carrying out at least one monitoring of at least one of the items of data generated by the active flight management system in order to verify if the item of data is valid, and the flight management assembly is configured for carrying out, in the case of validation of the monitored item of data, a synchronization of the monitoring and backup unit and of the passive flight management system, with data called synchronization data (described below) of the active flight management system.

Thus, thanks to this architecture, the monitoring unit by monitoring the active (or master) flight management system is capable of validating data (notably with the use of an increased integrity database, as described below), and in the case of validation, the monitoring and backup unit and the other (passive or slave) flight management system are synchronised with the active flight management system, that is to say they receive validated data. Thus, the three entities (the two flight management systems and the monitoring and safety unit) use the same data which are valid, in particular for computing guidance commands as described below, which notably makes it possible for the aircraft to have the capability of flying RNP operations such as mentioned above, and to overcome the abovementioned disadvantage.

Advantageously, the flight management assembly comprises at least a first database used by the flight management systems for computing at least some of the data, and a second database used by the monitoring and backup unit for carrying out the monitoring, the second database having an integrity (preferably of the DPAL1 type) greater than that (preferably of the DPAL2 type) of the first database.

Moreover, advantageously, the active flight management system is configured for computing a lateral trajectory, as a function of at least a reference flight plan and of meteorological data (notably positions of meteorological events), and the monitoring and backup unit is configured for verifying the validity of the lateral trajectory, with regard to the meteorological data.

Moreover, advantageously, the active flight management system is configured for computing a vertical trajectory along a lateral trajectory and from meteorological data, as a function of a safe altitude profile depending on the lateral trajectory, and the monitoring and backup unit is configured for verifying the validity of the vertical trajectory, with regard to the meteorological data (in particular the positions of meteorological events) and to a safe altitude profile extracted from a safe altitude database.

Moreover, advantageously, the active flight management system is configured for computing a first prediction of fuel on board the aircraft, along a validated lateral trajectory and a validated vertical trajectory, on the basis of data coming from a first database (preferably of the DPAL2 type) and the monitoring and backup unit is configured for computing a second prediction of fuel on board the aircraft, along the validated lateral trajectory and along the validated vertical trajectory, on the basis of data coming from a second database (preferably of the DPAL1 type) and the monitoring and backup unit is configured for verifying the validity of the first prediction of fuel on board the aircraft, with regard to the second prediction of fuel on board the aircraft.

Moreover, advantageously, the flight management assembly is configured for carrying out a synchronization of the monitoring and backup unit and of the flight management system with at least one of the following items of synchronization data of the active flight management system:

a flight plan;

a validated lateral trajectory and a validated vertical trajectory.

Moreover, advantageously, the flight management assembly comprises switching configured for, in the case of a failure of the active flight management system or in the case of detection by the monitoring and backup unit of an invalid active flight trajectory, generating a switching consisting of or comprising making the passive flight management system active and of making the active flight management system passive.

Moreover, in a particular embodiment, the two flight management systems are hosted in first and second items of hardware of a same first type, and the monitoring and backup unit is hosted in a third item of hardware different from the first and second items of hardware, the third item of hardware being of a second type different from the first type.

Moreover, advantageously, the two flight management systems and the monitoring and backup unit are each configured for determining guidance commands, the guidance commands being transmitted to a user system.

Moreover, advantageously, the monitoring and backup unit is configured for being able to display a so-called backup trajectory.

The disclosure herein also relates to a method of monitoring a flight management assembly, such as the one described above, which comprises two flight management systems one of which is active and the other of which is passive, and a monitoring and backup unit.

According to the disclosure herein, the monitoring method comprises the following successive steps:

a step of generation of data comprising at least one trajectory and at least one prediction of a parameter of the aircraft, used by at least the flight management system which is active;

a monitoring step, implemented by the monitoring and backup unit, consisting of or comprising carrying out at least a monitoring of at least one of the items of data generated by the active flight management system in order to verify if the item of data is valid; and a synchronization step consisting of or comprising carrying out, in the case of validation of the monitored item of data, a synchronization of the monitoring and backup unit and of the passive flight management system, with so-called synchronization data of the active flight management system.

Advantageously:

the data generation step consists of or comprises computing a lateral trajectory, as a function of at least a reference flight plan and of meteorological data; and the monitoring step consists of or comprises verifying the validity of the lateral trajectory, with regard to the meteorological data.

Moreover, advantageously:

the data generation step consists of or comprises computing a vertical trajectory along a lateral trajectory, as a function of a safe altitude profile depending on the lateral trajectory and on meteorological data; and the monitoring step consists of or comprises verifying the validity of the vertical trajectory, with regard to the meteorological data and to a safe altitude profile extracted from a safe altitude database.

Moreover, advantageously:

the data generation step consists of or comprises computing a first prediction of fuel on board the aircraft, along a validated lateral trajectory and along a validated vertical trajectory, on the basis of data coming from a first database; and the monitoring step consists of or comprises verifying the validity of the first prediction of fuel on board the aircraft, with regard to a second prediction of fuel on board the aircraft, along the validated lateral trajectory and the validated vertical trajectory, the second prediction being computed on the basis of data coming from a second database.

The disclosure herein also relates to an aircraft, in particular a transport aircraft, which is provided with a flight management assembly such as the one specified above.

BRIEF DESCRIPTION OF THE DRAWINGS

The appended figures will give a good understanding of how the disclosure herein can be embodied. In these figures, identical references refer to similar elements.

DETAILED DESCRIPTION

Figure 1:
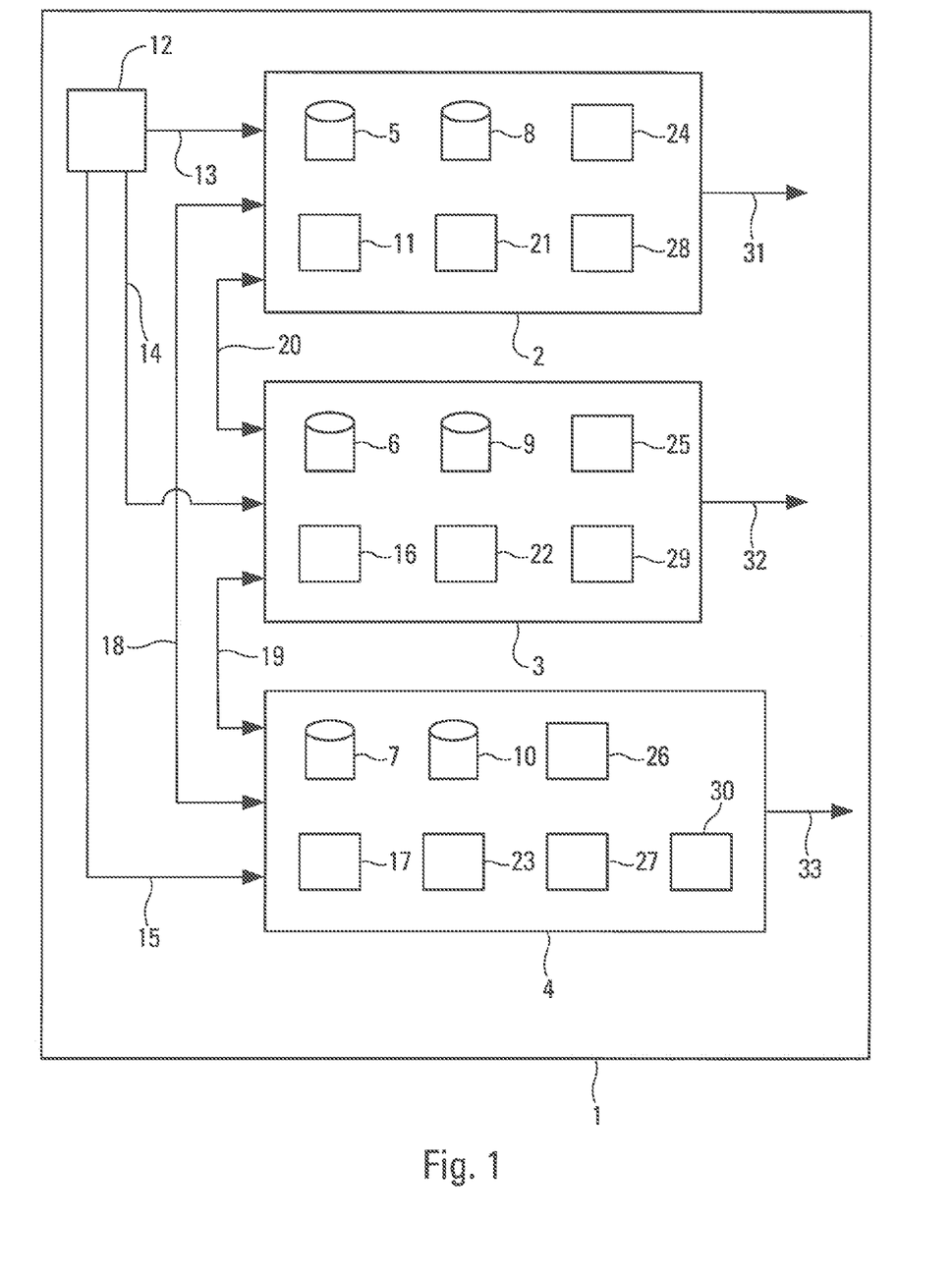
FIG. 1 is the block diagram of a particular embodiment of a flight management assembly of an aircraft.
Figure 2:
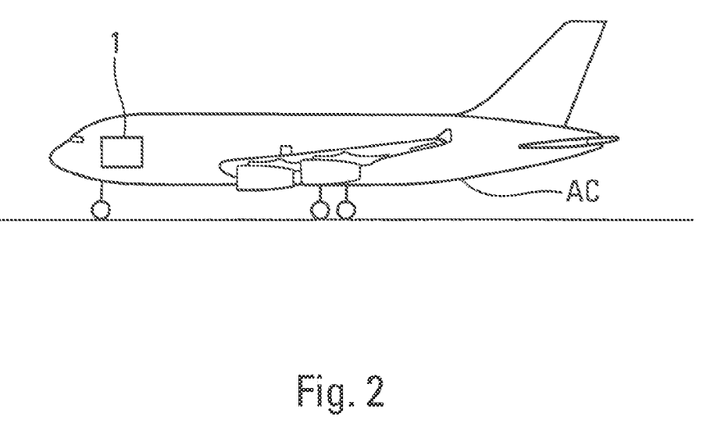
FIG. 2 shows an aircraft which comprises such a flight management assembly.

FIG. 1 is a diagrammatic representation of a particular embodiment of a flight management assembly 1 of an aircraft which makes it possible to illustrate the disclosure herein. This flight management assembly 1 is installed on board the aircraft AC, in particular a transport aircraft, as shown very diagrammatically in FIG. 2.

The flight management assembly 1 comprises two flight management systems 2 and 3 each being of the FMS type ("FMS" standing for "Flight Management System" in English). The two flight management systems 2 and 3 are independent and are hosted in items of hardware ("hardware" being the English term) which are different but of the same type. The expression "same type" is understood to mean that there is no dissimilarity between them.

Each of the flight management systems 2 and 3 comprises computing elements which are described below and which are configured for carrying out computations, notably of guidance commands for the aircraft and of data comprising at least a (flight) trajectory and at least a prediction of a parameter of the aircraft.

According to the disclosure herein, the flight management system 2 is active (or master) and the flight management system 3 is passive (or slave). The flight management assembly 1 comprises moreover a monitoring and backup (or standby) unit, hereafter referred to a "monitoring unit 4". By way of non-limiting example, the monitoring unit 4 is of the DALA type (DAL standing for "Design Assurance Level") and the two flight management systems 2 and 3 are of the DALB type.

The monitoring unit 4 is configured for carrying out at least a monitoring of at least one of the items of data generated by the active flight management system 2 in order to verify if this item of data is valid, as described below.

Moreover, the flight management assembly 1 is configured for carrying out, in the case of validation by the monitoring unit 4 of the monitored item of data, a synchronization of the monitoring unit 4 and of the passive flight management system 3, with so-called synchronization data of the active flight management system 2, as described below.

The monitoring unit 4 is hosted in an item of hardware ("hardware" being the English term) which is different from the items of hardware hosting the two flight management systems 2 and 3. Moreover, this item of hardware hosting the monitoring unit 4 is of a type different from the (similar) type of the two items of hardware hosting the two flight management systems 2 and 3.

The flight management assembly 1 also comprises:

a database 5, of the DPAL2 type, comprising safe altitudes which are used by the flight management system 2 for computing at least some of the data, as described below;

a database 6, of the DPAL2 type, comprising safe altitudes which are used by the flight management system 3 for computing at least some of the data; and a database 7, of the DPAL1 type, comprising safe altitudes which are used by the monitoring unit 4 for carrying out a monitoring.

The flight management assembly 1 comprises moreover:

a prediction database 8, of the DPAL2 type, which is used by the flight management system 2 for carrying out predictions, as described below;

a prediction database 9, of the DPAL2 type, which is used by the flight management system 3 for carrying out predictions; and a prediction database 10, of the DPAL1 type, which is used by the monitoring unit 4 also for carrying out predictions for the purpose of a monitoring.

The databases 7 and 10 (of the DPAL1 type) used by the monitoring unit 4 therefore have higher integrity and constraints than those of the databases 5, 6, 8 and 9 (of the DPAL2 type) used by the flight management systems 2 and 3.

In the example shown in FIG. 1, the databases 5 to 10 are represented inside the entities 2, 3 and 4. They can also be arranged in the flight management assembly 1, but outside of the entities 2, 3 and 4 while being connected to the latter however.

The active flight management system 2 comprises a computing element 11 which is configured for computing in the usual manner a lateral trajectory (of a flight trajectory of the aircraft) called active. The lateral trajectory represents the part of the fight trajectory (overall or complete) of the aircraft, situated in the horizontal plane. The computing element 11 computes the lateral trajectory, as a function of a reference flight plan, and of meteorological data. The reference flight plan is received and used, in the usual manner, by the flight management system 2. As for the meteorological data, these represent the positions of meteorological events (or cells) in the sky. These items of meteorological data come from a usual memory 12 containing meteorological data. In the example shown, the memory 12 of the usual type is connected by the intermediary of links 13, 14 and 15 to the flight management system 2, to the flight management system 3 and to the monitoring unit 4 respectively.

Similarly, the passive flight management system 3 also comprises a computing element 16 which is configured for computing in the usual manner a lateral trajectory (of a flight trajectory of the aircraft). The computing element 16 computes the lateral trajectory, also as a function of a reference flight plan and of meteorological data coming from the memory 12.

The monitoring unit 4 comprises a monitoring (or verification) element 17 which is configured for verifying the validity of the lateral trajectory determined by the active flight management system 2 and received from the latter, with regard to the meteorological data coming from the database 12. In particular it verifies that the lateral trajectory does not pass through meteorological cells, for example storm cells, likely to disturb the flight. In the case of successful verification, the monitoring unit 4 validates the lateral trajectory.

The monitoring unit 4 is connected by the intermediary of links 18 and 19, respectively, to the flight management systems 2 and 3, and the flight management systems 2 and 3 are connected together by the intermediary of a link 20.

Moreover, the active flight management system 2 comprises a computing element 21 which is configured for computing a vertical trajectory (of the flight trajectory of the aircraft) called active along the active lateral trajectory (computed by the computing element 11). The vertical trajectory represents the part of the flight trajectory (complete or overall) of the aircraft, situated in the vertical plane. The computing element 21 computes the vertical trajectory as a function of a safe altitude profile, and of meteorological data coming from the database 12. This safe altitude profile comprises a set of safe altitudes, which are extracted from the database 5 and are defined along the lateral trajectory computed by the computing element 11.

Similarly, the passive flight management system 3 comprises a computing element 22 which is configured for computing a vertical trajectory (of the flight trajectory of the aircraft) along the lateral trajectory (computed by the computing element 16). The computing element 22 computes the vertical trajectory as a function of a safe altitude profile, and of meteorological data coming from the database 12. This safe altitude profile is extracted from the database 6 as a function of the lateral trajectory computed by the computing element 16.

The monitoring unit 4 comprises a monitoring element 23 which is configured for verifying the validity of the vertical trajectory determined by the active flight management system 2 and received from the latter, with regard to meteorological data coming from the database 12 and to a safe altitude profile. This safe altitude profile is extracted from the database 7, as a function of the lateral trajectory computed by the computing element 11 of the active flight management system 2, which has been supplied to the monitoring unit 4.

The flight management assembly 1 is configured for, in the case of validation by the monitoring unit 4 of the complete flight trajectory (comprising the lateral trajectory and the vertical trajectory) generated by the active flight management system 2, carrying out a synchronization of the monitoring unit 4 and of the passive flight management system 3, with the flight plan of the active flight management system 2, and with the lateral trajectory and the vertical trajectory (thus validated) of the active flight management system 2. In other words, the flight plan used by the active flight management system 2 and the complete flight trajectory (determined by the active flight management system 2 and validated by the monitoring unit 4) are transmitted to the monitoring unit 4 and to the passive flight management system 3 which use them in the following processings and computations. The validated flight trajectory (comprising the lateral trajectory and the vertical trajectory), received by the monitoring unit 4, is recorded by the latter in a buffer memory (not shown), as a standby (or backup) trajectory.

This synchronization (or updating) is carried out at each new validation of the flight trajectory by the monitoring unit 4. This updating can be carried out periodically and/or each time following an event modifying an item of data used in the computations.

Moreover, the active flight management system 2 comprises a processing element 24 which is configured for computing a prediction of a parameter of the aircraft. In a preferred embodiment, the processing element 24 computes a prediction EFOB1 of the fuel available on board the aircraft, along the validated lateral trajectory and along the validated vertical trajectory, on the basis of data coming from the prediction database 8.

Similarly, the passive flight management system 3 comprises a processing element 25 which is configured for computing a prediction of a parameter of the aircraft. In a preferred embodiment, the processing element 24 computes a prediction EFOB2 of the fuel available on board the aircraft, along the validated lateral trajectory and along the validated vertical trajectory, on the basis of data coming from the prediction database 9.

The monitoring unit 4 also comprises a processing element 26 which is configured for computing a prediction of a parameter of the aircraft. In a preferred embodiment, the processing element 24 computes a prediction EFOB3 of the fuel available on board the aircraft, along the validated lateral trajectory and along the validated vertical trajectory, on the basis of data coming from the prediction database 10.

Moreover, the monitoring unit 4 comprises a monitoring (or verification) element 27 which is configured for verifying the validity of the prediction EFOB1 of fuel on board the aircraft (determined by the active flight management system 2 on the basis of data coming from the database 8), with regard to the prediction EFOB3 of fuel on board the aircraft (determined by the monitoring unit 4 on the basis of data coming from the database 10), and it validates this prediction EFOB1 if the difference between the two predictions EFOB1 and EFOB3 is less than a predetermined margin.

Moreover, the flight management assembly 1 comprises switching (not shown) which is configured for generating a switching, in the case of failure of the active flight management system 2 and/or if the monitoring unit 4 has concluded that the active lateral trajectory and/or the active vertical trajectory (determined by the flight management system 2) are invalid. This switching consists of or comprises making the passive flight management system 3 active (or master) and of making the active flight management system 2 passive (or slave). In a particular embodiment, the switching comprises a button (not shown) which is installed in the cockpit and which makes it possible for a crew member to control the switching manually. Moreover, in a variant embodiment, the control comprises at least one control unit (for example forming part of the monitoring unit 4) which carries out the switching automatically when the conditions for the switching are met.

The computations of the passive (or slave) flight management system 3 are not used (notably by the monitoring unit 4) as long as the active (or master) flight management system 2 has not failed and the active trajectory is validated by the monitoring unit 4.

On the other hand, in the case of failure of the active flight management system 2 or if the active (flight) trajectory is declared invalid by the monitoring unit 4, the active state is thus switched, via the monitoring unit 4, between the two flight management systems 2 and 3, and a new set of verifications (or of monitorings) is implemented by the monitoring unit 4. This new set of verifications is based on computations carried out by computing elements (for example the computation elements 16, 22 and 25) of the flight management system 3.

If this second flight management system 3 has also failed or fails or if the result of its trajectory computation is declared invalid by the monitoring unit 4, the trajectory (called backup) stored in the monitoring unit 4 is not updated, and the most recently stored backup trajectory is used for example by a guidance computer for the purpose of guiding the aircraft.

In a particular embodiment, the flight management assembly 1 is configured for, during exchanges of information between different elements of the flight management assembly 1 and notably between the entities 2, 3 and 4, returning the data received from any transmitting source (for example one of the entities 2, 3 and 4) to the transmitting source and comparing (at the level of the transmitting source) the transmitted data and the received and returned data with each other. This verification mode makes it possible to detect corruption during the transmission of information between the different elements or entities of the flight management assembly 1.

Moreover, the two flight management systems 2 and 3 and the monitoring unit 4 each comprise a computing element 28, 29, 30. Each of these computing elements 28, 29 and 30 is configured for determining in the usual manner guidance commands (or instructions) on the basis of the trajectories available to the two flight management systems 2 and 3 and the monitoring unit 4. The guidance commands computed by these computing elements 28, 29 and 30 are transmitted to at least one system user (not shown) and notably to a guidance computer of the aircraft, by the intermediary of links 31, 32 and 33 respectively.

Consequently, the three entities 2, 3 and 4 compute their own guidance commands and send them simultaneously to computing channels COM and to monitoring channels MON of the guidance computer or computers of the aircraft, which derive from them the median value and use this median value for guiding the aircraft.

The guidance of aircraft is therefore carried out according to data (and notably to guidance commands) provided by the three entities 2, 3 and 4 by the intermediary of the links 31, 32 and 33.

Moreover, the monitoring unit 4 is configured for being able to display a so-called backup trajectory, on a usual display unit (not shown) which receives for example the backup trajectory to be displayed by the intermediary of the link 33 from the monitoring unit 4.

Figure 3:
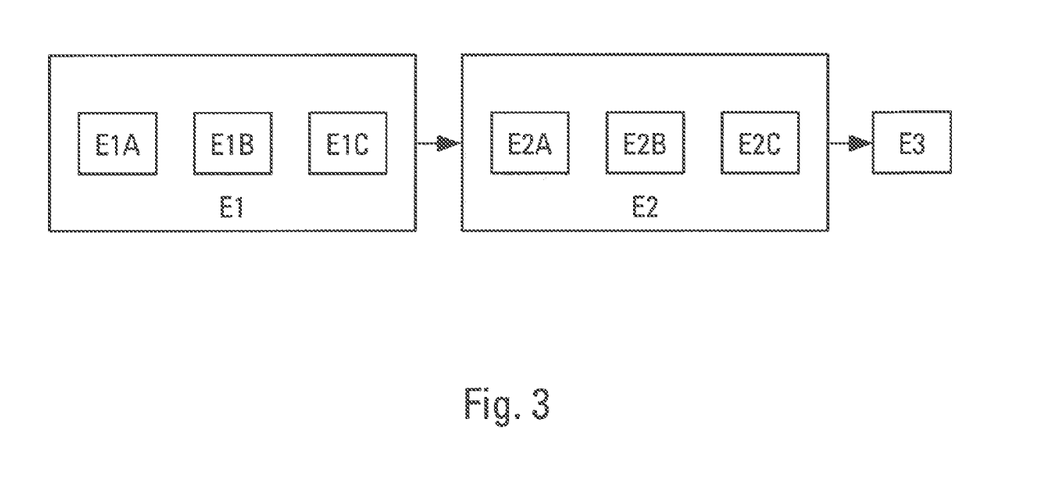
FIG. 3 is a diagrammatic representation of the principal steps of a particular embodiment of a method of monitoring a flight management assembly.

The flight management assembly 1, such as described above, is capable of implementing a monitoring method represented diagrammatically in FIG. 3.

This monitoring method notably comprises the following principal steps:

a data generation step E1 for generating data comprising at least one trajectory and at least one prediction of a parameter of the aircraft, implemented by the flight management system 2 which is active;

a monitoring step E2, implemented by the monitoring unit 4, consisting of or comprising carrying out at least one monitoring of at least one of the items of data generated by the active flight management system 2 in order to verify if the item of data is valid; and a synchronization step E3 consisting of or comprising carrying out, in the case of validation of the monitored item of data, a synchronization of the monitoring unit 4 and of the passive flight management system 3, with synchronization data of the active flight management system 2. According to a first feature:

the data generation step E1 comprises a sub-step DA consisting of or comprising computing a lateral trajectory, as a function of at least a reference flight plan and of meteorological data; and the monitoring step E2 comprises a sub-step E2A consisting of or comprising verifying the validity of the lateral trajectory, with regard to the meteorological data.

According to a second feature:

the data generation step E1 comprises a sub-step E1B consisting of or comprising computing a vertical trajectory along a lateral trajectory, as a function of a safe altitude profile depending on the lateral trajectory and on meteorological data; and the monitoring step E2 comprises a sub-step E2B consisting of or comprising verifying the validity of the vertical trajectory, with regard to the meteorological data and to a safe altitude profile extracted from the safe altitude database 7.

Moreover, according to a third feature:

the data generation step E1 comprises an auxiliary sub-step E1C consisting of or comprising computing a prediction EFOB1 of fuel on board the aircraft, along a validated lateral trajectory and a validated vertical trajectory, on the basis of data coming from the prediction database 8; and the monitoring step E2 comprises a sub-step E2C consisting of or comprising verifying the validity of the prediction EFOB1 of fuel on board the aircraft, in comparison with a prediction EFOB3 of fuel on board the aircraft, along the validated lateral trajectory and the validated vertical trajectory, computed on the basis of data coming from the prediction database 10.

The operation of the flight management assembly 1, is described hereafter in more detail, by presenting an example of both successive computations and successive monitorings, in relation to the steps shown in FIG. 3:

E1A/the active and slave flight management systems 2 and 3 carry out their own computations of the lateral trajectory, according to the definition of the reference flight plan and to the current active guidance mode, taking account of the position of meteorological events coming from the memory 12. The active flight management system 2 sends the lateral trajectory thus computed to the monitoring unit 4;

E2A/the monitoring unit 4 verifies the validity of the lateral trajectory, with regard to the meteorological data;

E1B/the flight management systems 2 and 3 extract a safe altitude profile, under the computed lateral trajectory, from specific (safe altitude) databases 5 and 6 of the DPAL2 type. This safe altitude profile is used for computing the vertical trajectory adapted to the terrain. The active and slave flight management systems 2 and 3 construct their vertical trajectories corresponding to their own lateral trajectories while taking into account the meteorological data. The active flight management system 2 sends its vertical trajectory to the monitoring unit 4;

E2B/the monitoring unit 4 extracts a safe altitude profile corresponding to the received lateral trajectory, using the safe altitude database 7, of the DPAL1 type. The monitoring unit 4 verifies the validity of the vertical trajectory with regard to the safe altitude profile and to the meteorological data. The monitoring unit 4 declares, if appropriate, the validity of the complete (or overall) trajectory;

E3/if the complete trajectory (both lateral and vertical) of the active flight management system 2 is validated, the slave and backup functions (namely the monitoring unit 4 and the passive flight management system 3) are resynchronized with this validated complete trajectory of the active flight management system 2;

E2C/the flight management systems 2 and 3 compute forward predictions, along the synchronised complete trajectory, of the quantity of fuel available on board the aircraft, from the prediction databases 8 and 9 of the DPAL2 type. The active flight management system 2 sends the result EFOB1 of its prediction computation to the monitoring unit 4;

E2D/the monitoring unit 4 uses the prediction database 10 of the DPAL1 type in order to compute the forward predictions. The monitoring unit 4 validates (or not) the result EFOB1 with regard to its own estimation EFOB3.

The flight management assembly 1, such as described above, is thus based on an architecture comprising two flight management systems 2 and 3 (linked with each other via a master/slave configuration) and a monitoring (and backup) unit 4 which carries out monitorings and backups, notably of the flight trajectory.

This architecture and the operations carried out make it possible:

to avoid having to install for example a third flight management system (to be used as a third data source), which would be costly and complicated;

to validate data computed by the active flight management system 2 using data coming from databases 7 and 10 of greater integrity and to resynchronize the passive flight management system 3 and the monitoring unit 4 with the active flight management system 2; and to identify, if applicable, a defective active flight management system 2 and to make it possible to continue the operation on the flight management system 3 that has not failed.

The monitoring unit 4 does not comprise a complete flight plan and trajectory computation function, unlike the flight management systems 2 and 3. It comprises a buffer memory ("buffer" being the English term) which is periodically synchronised with the active flight management system 2.

The monitoring unit 4 is not capable of refreshing the stored trajectory if the two flight management systems 2 and 3 fail simultaneously. It comprises, however, logic for sequencing the stored trajectory and the stored flight plan, computing elements capable of computing precise predictions (based on the performance database 10 of the DPAL1 type) and guidance commands along the most recently synchronised flight trajectory, received from the active flight management system 2, and the capability of displaying the backup trajectory on usual display elements (not shown) of the flight management assembly 1.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight management assembly of an aircraft, the flight management assembly comprising
two flight management systems, each of the flight management systems being configured for generating data comprising at least one trajectory and at least one prediction of a parameter of the aircraft, wherein one of the flight management systems is an active flight management system and another of the flight management systems is a passive flight management system, and
a monitoring and backup unit in communication with the two flight management systems, the monitoring and backup unit being configured for carrying out at least one monitoring of at least one of items of data generated by the active flight management system in order to verify if the item of data is valid,
wherein the flight management assembly is configured for carrying out, in case of the monitored item of data being identified as valid, a synchronization of the monitoring and backup unit and of the passive flight management system, with data called synchronization data of the active flight management system corresponding to the item of data identified as valid, and
wherein the flight management assembly is configured for computing guidance commands based on the item of data identified as valid.

2. The flight management assembly according to claim 1, comprising at least a first database used by the flight management systems for computing at least some of the data, and a second database used by the monitoring and backup unit for carrying out the monitoring, the second database having an integrity greater than that of the first database.

3. The flight management assembly according to claim 1, wherein the active flight management system is configured for computing a lateral trajectory, as a function of at least a reference flight plan and of meteorological data, and wherein the monitoring and backup unit is configured for verifying validity of the lateral trajectory, with regard to the meteorological data.

4. The flight management assembly according to claim 1, wherein the active flight management system is configured for computing a vertical trajectory along a lateral trajectory as a function of a safe altitude profile depending on the lateral trajectory and meteorological data, and wherein the monitoring and backup unit is configured for verifying validity of the vertical trajectory, with regard to the meteorological data and to a safe altitude profile extracted from a safe altitude database.

5. The flight management assembly according to claim 1, wherein the active flight management system is configured for computing a first prediction of fuel on board the aircraft, along a validated lateral trajectory and a validated vertical trajectory, on a basis of data coming from a first database wherein the monitoring and backup unit is configured for computing a second prediction of fuel on board the aircraft, along the validated lateral trajectory and along the validated vertical trajectory, on a basis of data coming from a second database, and wherein the monitoring and backup unit is configured for verifying validity of the first prediction of fuel on board the aircraft, with regard to the second prediction of fuel on board the aircraft.

6. The flight management assembly according to claim 1, wherein the flight management assembly is configured for carrying out a synchronization of the monitoring and backup unit and of the passive flight management system with at least one of following items of synchronization data of the active flight management system:
a flight plan;
a validated lateral trajectory and a validated vertical trajectory.

7. The flight management assembly according to claim 1, comprising switching configured for, in case of a failure of the active flight management system or in case of detection by the monitoring and backup unit of an invalid active trajectory, generating a switching comprising making the passive flight management system active and of making the active flight management system passive.

8. The flight management assembly according to claim 1, wherein the two flight management systems are hosted in first and second items of hardware different from a same first type, and wherein the monitoring and backup unit is hosted in a third item of hardware different from the first and second items of hardware, the third item of hardware being of a second type different from the first type.

9. The flight management assembly according to claim 1, wherein the two flight management systems and the monitoring and backup unit are each configured for determining the guidance commands, the guidance commands being transmitted to a user system.

10. The flight management assembly according to claim 1, wherein the monitoring and backup unit is configured for display a backup trajectory.

11. An aircraft comprising a flight management assembly according to claim 1.

12. A method of monitoring a flight management assembly comprising two flight management systems, one which is active and another which is passive, and a monitoring and backup unit,
wherein the monitoring method comprises successive steps at least comprising:
a step of generation of data comprising at least one trajectory and at least one prediction of a parameter of the aircraft, used by at least the flight management system which is active;
a monitoring step, implemented by the monitoring and backup unit, comprising carrying out at least a monitoring of at least one of items of data generated by the active flight management system in order to verify if an item of data is valid;
a synchronization step comprising carrying out, in case of the monitored item of data being identified as valid, a synchronization of the monitoring and backup unit and of the passive flight management system, with synchronization data of the active flight management system corresponding to the item of data identified as valid, and a computation step comprising computing guidance commands based on the item of data identified as valid.

13. The method according to claim 12, wherein:

the data generation step comprises computing a lateral trajectory, as a function of at least a reference flight plan and of meteorological data; and the monitoring step comprises verifying the validity of the lateral trajectory, with regard to the meteorological data.

14. The method according to claim 12, wherein:

the data generation step comprises computing a vertical trajectory along a lateral trajectory, as a function of a safe altitude profile depending on the lateral trajectory and on meteorological data; and the monitoring step comprises verifying the validity of the vertical trajectory, with regard to the meteorological data and to a safe altitude profile extracted from a safe altitude database.

15. The method according to claim 12, wherein:

the data generation step comprises computing a first prediction of fuel on board the aircraft, along a validated lateral trajectory and along a validated vertical trajectory, on a basis of data coming from a first database; and the monitoring step comprises verifying the validity of the first prediction of fuel on board the aircraft, with regard to a second prediction of fuel on board the aircraft, along the validated lateral trajectory and the validated vertical trajectory, the second prediction being computed on a basis of data coming from a second database.

* * * * *